United States Patent Office 3,651,164
Patented Mar. 21, 1972

3,651,164
DEHYDROCYCLIZATION OF HYDROCARBONS
Donald C. Tabler and Marvin M. Johnson, Bartlesville, Okla., assignors to Phillips Petroleum Company
No Drawing. Filed July 24, 1970, Ser. No. 58,179
Int. Cl. C07c 5/26
U.S. Cl. 260—673.5    9 Claims

ABSTRACT OF THE DISCLOSURE

A method for dehydrocyclization of alkanes having from about 7 to about 20 carbon atoms by contact with hydrogen and with a catalyst of nickel, cobalt or iron in combination with arsenic or antimony.

---

This invention relates to dehydrocyclization of hydrocarbons.

In one of its more specific aspects, this invention relates to the catalytic dehydrocyclization of paraffin hydrocarbons to aromatic compounds.

A wide variety of conversion processes are of significance because they convert less desirable hydrocarbons into compounds which are in greater demand than is the feedstock. The method and catalyst of the present invention are similarly useful and applicable in converting paraffins to aromatic compounds.

According to the method of the present invention there is provided a process for the dehydrocyclization of alkanes having from about 7 to about 20 carbon atoms by contacting the alkane with hydrogen and with a catalyst having the general formula $MY_x$ as hereinafter defined.

According to this invention there is also provided a catalyst for the dehydrocyclization of alkanes having from about 7 to about 20 carbon atoms which has the formula $MY_x$ as hereinafter defined.

Accordingly, it is an object of this invention to provide a process for producing aromatics.

It is another object of this invention to provide a simply prepared dehydrocyclization catalyst.

These and other objects of this invention will become evident from the following disclosure.

The method of this invention is directed to the dehydrocyclization of alkanes having from about 7 to about 20 carbon atoms per molecule. Typical of such feedstocks are n-heptane, isooctane, octane, nonane, decane, n-hexadecane, n-eicosane, and the like.

The alkanes are dehydrocyclized by simultaneously contacting them with hydrogen and a catalyst to produce aromatic compounds such as toluene, xylene, trimethylbenzenes and the like.

The catalysts with which the alkanes are contacted comprise at least one of iron, cobalt and nickel and at least one of arsenic and antimony. In its preferred form, the catalyst is a supported cobalt antimonide.

Generally, the catalysts will have the formula $MY_x$, in which M is a metal selected from the group consisting of nickel, cobalt and iron; Y is arsenic or antimony, and $x$ is an integer having a value from about 0.1 to about 10, preferably from about 0.5 to about 1. The catalyst is supported on a mildly acid substrate and the nickel, iron, or cobalt comprises from about 3 to about 15 weight percent of the total weight of the catalytic composition, including the support, and preferably from about 5 to about 10 weight percent.

Any suitable support which is mildly acidic can be employed. Suitable substrates include alumina, magnesia, calcium aluminate and their mixtures. A preferred support is a flame hydrolyzed alpha-alumina commercially available as Alon-C from Cabot Corporation of Boston, Mass.

The metal-arsenic or antimony compound can be deposited on the support in any suitable manner; this is most easily done from aqueous solutions, the resulting impregnated solid being thereafter calcined and activated by reducing in a hydrogen atmosphere at elevated temperatures.

The process of the invention is conducted by passing an alkane, in the vapor phase, having 7 to 20 carbon atoms per molecule, and hydrogen into contact with the catalyst at reaction temperatures in the range of from about 600° F. to about 1200° F. and at pressures in the range of from about atmospheric to 1500 p.s.i.g. at alkane liquid hourly space velocities of about 0.5 to 5 ml. of alkane per ml. of catalyst per hour, the hydrogen being introduced at the rate of about 0.5 to about 10 moles per mole of alkane. The alkane can be diluted with a nonreactant.

The process of this invention is preferably conducted at temperatures in the range of 800 to 1000° F. and at pressures in the range of 600 to 1000 p.s.i.g. for any reaction time which produces the desired conversion.

The following examples and runs illustrate the method of preparing the catalyst of the invention and the method of the invention. While these runs are necessarily restricted to certain embodiments of the invention, they are not to be considered as limiting the invention thereto.

EXAMPLE I

A catalyst comprising cobalt and antimony supported on Alon-C alumina was prepared according to the following procedure.

Thirty-three and nine-tenths grams (33.9 g.) of cobalt acetate $Co(C_2H_3O_2)_2 \cdot 4H_2O$ were dissolved in 225 ml. of water and the resulting solution cooled in an ice bath.

To the chilled solution were added 26 ml. of $SbCl_5$. Seventy grams (70 g.) of alumina were stirred into the resulting solution to form a paste. To the paste were added 100 ml. of 28 percent ammonium hydroxide solution.

The paste, which had a pH of 7, was dried at 25° C. in air for about 96 hours and at 105° C., in air for 1.5 hours. It was then heated in air at 600° F. for 1.5 hours and in air at 1000° F. for 1 hour. It was then crushed to 10–35 U.S. mesh.

The finished catalyst contained 7.6 weight percent cobalt and 13.0 weight percent antimony; it had a pore volume of 0.66 cc./g. and a surface area of 92 m.²/g.

EXAMPLE II

A catalyst similar to that prepared in Example I was prepared by the same procedure using 33.9 g. of cobalt acetate, dissolved in 225 ml. of water, 13 ml. of $SbCl_5$, and 70 g. of alumina. To the paste were added 65 ml. of 28 percent ammonium hydroxide solution. The paste was dried in air at 210° F. for 120 hours and was then crushed and screened to 10–40 U.S. mesh particles. The particles were calcined in air at 900° F. for 3 hours and in air at 1000° F. for 3 hours. The catalyst was then reduced in hydrogen at 800° F. for 2 hours. The finished catalyst contained 9.8 weight percent cobalt and 8.0 weight percent antimony.

EXAMPLE III

Nine and eight-tenths grams (9.8 g.) of that catalyst prepared in Example I were mixed with 20.9 g. of that catalyst prepared in Example II. Thirty and seven-tenths grams (30.7 g.) of the mixture having a volume of 50 cc. were arranged in a packed bed and activated by passing 800° F. hydrogen through the bed at 800 p.s.i.g. for about one hour.

The resulting catalyst was employed for the dehydrocyclization, or reforming, of n-hexadecane under the following conditions:

Run No. 1

| | |
|---|---|
| Alkane feed rate, LHSV | 1 |
| Hydrogen rate, moles/moles alkane | 4.6 |
| Reaction temperature, °F. | 858 |
| Reaction pressure, p.s.i.g. | 600 |

Results were as follows:

| Component: | Moles product produced [1] |
|---|---|
| $C_{15}$ and lighter paraffins | 228.0 |
| Benzene | 1.0 |
| Toluene | 1.4 |
| $C_8$ aromatics | 1.3 |
| $C_9$ aromatics | 3.5 |
| $C_{10}$ aromatics | 0.8 |

[1] Per 100 moles n-hexadecane feed.
Conversion of n-hexadecane was 64.1 moles per 100 moles of feed.

The above data illustrate the operability of the method and catalyst of this invention in reforming an alkane.

EXAMPLE IV

A portion of that catalyst prepared in Example I was arranged in a packed bed. The catalyst was then activated by passing hydrogen through the bed at 800 p.s.i.g. and a temperature of 1050° F. for 2 hours. Thereafter, the catalyst was employed in four runs for the dehydrocyclization of isooctane, that is, 2,2,4-trimethylpentane. Operating conditions and results were as follows:

| Run Number | 2 | 3 | 4 | 5 |
|---|---|---|---|---|
| Alkane rate. LHVS | 1.0 | 1.0 | 1.0 | 1.0 |
| Hydrogen rate, moles/moles alkane | 3.8 | 3.4 | 3.7 | 3.4 |
| Reaction temperature, °F | 930 | 984 | 1,040 | 1,000 |
| Reaction pressure, p.s.i.g | 400 | 400 | 400 | 100 |
| Liquid product analysis, wt. percent: | | | | |
| Isooctane | 86.15 | 36.81 | 5.70 | 32.05 |
| Paraffins lighter than isooctane | 7.21 | 8.79 | 6.00 | 12.16 |
| Benzene | 0.10 | 0.40 | 1.63 | 1.29 |
| Toluene | 1.98 | 8.92 | 23.75 | 19.57 |
| Xylenes | 1.60 | 13.46 | 24.72 | 11.98 |
| Trimethylbenzenes | 1.51 | 15.91 | 18.05 | 11.51 |
| Other $C_9$ and $V_{10}$ aromatics | 1.43 | 15.69 | 20.19 | 11.46 |

The above data illustrate the operability of the method and catalyst of this invention in reforming an alkane at various operating conditions.

It will be evident from the foregoing that various modifications can be made to the method and catalyst of this invention. However, such are considered as being within the scope of the invention.

What is claimed is:

1. A method for the dehydrocyclization of an alkane having from about 7 to about 20 carbon atoms which comprises contacting said alkane with hydrogen and with a catalyst having the general formula $MY_x$ in which M is a metal selected from the group consisting of nickel, cobalt and iron, Y is selected from the group consisting of arsenic and antimony and $x$ is an integer having a value from about 0.1 to about 10.

2. The method as defined in claim 1 in which said catalyst is supported on a mildly acidic support.

3. The method as defined in claim 2 in which said support is mildly acidic and is selected from the group consisting of alumina, magnesia, and calcium aluminate.

4. The method as defined in claim 2 in which said alkane is passed into contact with said catalyst at a temperature of from about 600° F. to about 1200° F., at a pressure of from about atmospheric to about 1500 p.s.i.g. at an alkane liquid hourly space velocity of from about 0.5 to 5, said alkane being in the vapor state, said hydrogen being present in an amount of from about 0.5 to about 10 moles per mole of alkane.

5. The method as defined in claim 2 in which said catalyst comprises cobalt and antimony supported on alumina.

6. The method as defined in claim 2 in which n-hexadecane is dehydrocyclized at a temperature of about 860° F. and a pressure of about 600 p.s.i.g. at a n-hexadecane liquid hourly space velocity of about 1 and a hydrogen to n-hexadecane mole to mole ratio of about 4.5.

7. The method as defined in claim 2 in which 2,2,4-trimethylpentane is dehydrocyclized at a temperature of from about 930° F. to about 1040° F., at a pressure of about 400 p.s.i.g, at a 2,2,4-trimethylpentane liquid hourly space velocity of about 1 and a hydrogen to 2,2,4-trimethylpentane ratio of from about 3.4 to about 3.8.

8. The method as defined in claim 2 in which the metal selected from the group consisting of nickel, cobalt and iron comprises from about 3 to about 15 weight percent of the total weight of said catalyst.

9. The method as defined in claim 1 in which said alkane is selected from the group consisting of n-hexadecane and 2,2,4-trimethylpentane.

References Cited

UNITED STATES PATENTS

| | | | |
|---|---|---|---|
| 3,360,586 | 12/1967 | Bloch et al. | 260—683.3 |
| 3,291,755 | 12/1967 | Haensel et al. | 252—464 |
| 2,449,295 | 9/1948 | Gutzeit | 252—254 |

PAUL M. COUGHLAN, JR., Primary Examiner

J. M. NELSON, Assistant Examiner

U.S. Cl. X.R.

208—137; 252—464, 473